United States Patent Office 3,455,915
Patented July 15, 1969

3,455,915
SUBSTITUTED BENZOXAZINES AND BENZOTHIAZINES
John Krapcho, Somerset, N.J., assignor to E. R. Squibb & Sons, Inc., New York, N.Y., a corporation of Delaware
No Drawing. Filed Sept. 28, 1966, Ser. No. 582,522
Int. Cl. C07d 93/14, 87/48; A61k 27/00
U.S. Cl. 260—243                    6 Claims

ABSTRACT OF THE DISCLOSURE

Compounds having the formula

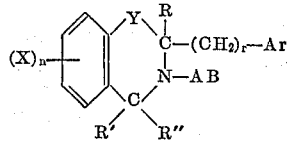

and optical isomers and salts thereof, wherein Ar is $(X^1)_n$-substituted aryl; R is selected from the group consisting of hydrogen, lower alkyl and $(X^2)_n$-substituted aryl; R' and R" taken separately are both hydrogen; R' and R" taken together is oxo; Y is selected from the group consisting of O, S, sulfone ($SO_2$) and sulfoxide (SO); X, $X^1$ and $X^2$ may be the same or different and are selected from the group consisting of hydrogen, lower alkyl, lower alkoxy, amino, di(lower alkyl)amino, halo, lower alkylthio, hydroxy, cyano, nitro and trifluoromethyl; n is an integer from one to three; r is an integer from 0 to 3; A is lower alkylene; and B is a basic nitrogen-containing radical. These compounds possess central nervous system modifying activity (e.g., as depressants which are useful as tranquilizers). They have also been found to possess antibacterial activity.

This invention relates to new chemical compounds having valuable therapeutic properties and processes for the preparation thereof.

The therapeutically active compounds of this invention have the general formula

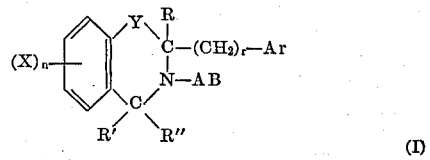
(I)

and optical isomers and salts thereof, wherein Ar is $(X^1)_n$-substituted aryl; R is selected from the group consisting of hydrogen, lower alkyl and $(X^2)_n$-substituted aryl; R' and R" taken separately are both hydrogen; R' and R" taken together is oxo; Y is selected from the group consisting of O, S, sulfone ($SO_2$) and sulfoxide (SO); X, $X^1$ and $X^2$ may be the same or different and are selected from the group consisting of hydrogen, lower alkyl, lower alkoxy, amino, di(lower alkyl)amino, halo, lower alkylthio (e.g., $CH_3CH_2CH_2S-$), hydroxy, cyano, nitro and trifluoromethyl; n is an integer from one to three; r is an integer from 0 to 3; A is lower alkylene; and B is a basic nitrogen-containing radical.

Among the suitable radicals represented by the symbol B are amino (lower alkyl)amino, such as methyl amino, ethyl amino and the like, di(lower alkyl)amino, such as dimethyl amino, diethyl amino and the like, (hydroxy-lower alkyl)amino, such as hydroxyethylamino and the like, di(hydroxy-lower alkyl)amino, such as di(hydroxy-ethyl)amino and the like, (phenyl-lower alkyl)amino, such as benzyl amino, phenethyl amino and the like, (lower alkyl) (phenyl-lower alkyl)amino, and saturated nitrogen heterocyclics having 5 to 7 atoms in the ring and which may have one additional hetero atom in the ring. A substituent may also be attached to the nitrogen heterocyclic.

Heterocyclics represented by B are those having the formula

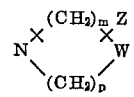

in which W represents NZ', $CH_2$, O or S, m represents an integer from 1 to 4, p represents an integer from 0 to 3, the total of $m+p$ being less than 7, Z represents hydrogen, lower alkyl and lower alkoxy, and Z' represents hydrogen, lower alkyl, lower alkoxy, hydroxy-lower alkyl, alkanoyloxy-lower alkyl, alkanoyloxy-lower alkoxy lower alkyl, hydroxy-lower alkoxy-lower alkyl di(lower alkyl)amino-lower alkyl, di(lower alkyl)amino-lower alkoxy-lower alkyl, allyl, propargyl, cycloalkyl, cycloalkyl-lower alkyl, X-substituted phenyl, X-substituted phenyl-lower alkyl, and X-substituted phenyl-lower alkenyl (e.g., p-chlorocinnamyl. These may be exemplified by piperidyl [i.e., piperidino, 2-piperidyl, 3-piperidyl and 4-piperidyl]; (lower alkyl)piperidyl [e.g., 2,3, or 4-(lower alkyl)piperidino or 2,3 or 4-(N-lower alkyl) piperidyl; or 2,3 or 4-(N-lower alkyl-2,3 or 4-(lower alkyl)piperidyl]; hydroxy piperidyl, such as hydroxy piperidino;
(lower alkoxy)piperidyl;
pyrrolidyl;
(lower alkyl)pyrrolidyl;
(lower alkoxy)pyrrolidyl;
morpholino;
(lower alkyl)morpholino;
di(lower alkyl)morpholino;
(lower alkoxy)morpholino;
thiamorpholino;
(lower alkyl)thiamorpholino;
di(lower alkyl)thiamorpholino;
(lower alkoxy)thiamorpholino;
piperazyl;
(lower alkyl)piperazyl (e.g., $N^4$-methylpiperazino);
di(lower alkyl)piperazyl;
(lower alkoxy)piperazyl;
(hydroxy-lower alkyl)piperazyl [e.g., $N^4$-(2-hydroxyethyl)piperazino];
alkanoyloxy-lower-alkyl piperazyl [e.g., $N^4$(2-acetoxyethyl)piperazino,
$N^4$-(2-heptanoyloxyethyl)piperazino,
$N^4$-(2-dodecanoyloxyethyl)piperazino];
(hydroxy-lower alkoxy-lower alkyl)piperazyl [e.g., $N^4$-(2-hydroxyethoxyethyl)piperazino];
di(lower alkyl)amino-(lower alkyl)piperazyl [e.g., $N^4$-dimethylaminoethylpiperazino];
di(lower alkyl)amino-(lower alkoxy-lower alkyl) piperazyl [e.g., $N^4$-(2-dimethylaminoethoxyethyl) piperazino];

aryl piperazino [e.g., $N^4$-(o-methoxyphenyl)piperazino] and homopiperazyl and substituted homopiperazyl [e.g., $N^4$-ethylhomopiperazino, $N^4$-benzylhomopiperazino, $N^4$-(p-hydroxyphenyl)homopiperazino, $N^4$-(o-acetoxybenzyl) homopiperazino and $N^4$-(hydroxyethyl)homopiperazino].
The terms "lower alkyl," "lower alkoxy," and "lower alkylene" as employed herein, include both straight and branched chain radicals of less than eight carbon atoms. The term "alkanoyloxy" includes radicals of up to 14 carbon atoms.

The term "aryl" as employed herein includes mononuclear and dinuclear radicals such as phenyl, substituted phenyl (including 3,4 - methylenedioxyphenyl and 3,4 - ethylenedioxyphenyl), furyl, thienyl, naphthyl or pyridyl.

It is readily apparent from the above that it is intended that the linkage between the heterocyclic radical (B) and the alkylene radical (A) may be through any carbon or nitrogen atom in the heterocyclic ring, and that Z may be linked to any position on the ring having a replaceable hydrogen atom.

This invention also includes salts of the above defined bases formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicyclic, methylsulfonic, ethanesulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic, cyclohexanesulfamic and theophylline acetic acids as well as with 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well known to the art. Also included within the purview of this invention are the non-toxic quaternary ammonium salts which include those formed with alkyl halides (e.g., methyl chloride, isobutyl bromide, dodecyl chloride and cetyl iodide), benzyl halides (e.g., benzyl chloride) and dilower alkyl sulfates (e.g., dimethyl sulfate).

The particularly preferred compounds of this invention are those wherein Y is sulfur, X and X' are hydrogen, R is hydrogen or lower alkyl, R' and R" are taken together as oxo, and —AB represents a di(lower alkyl)amino lower alkyl radical.

Compounds of this invention and the salts thereof possess central nervous system modifying activity (e.g., as depressants which are useful as tranquilizers). They may be administered orally or parenterally in the form of tablets, capsules, elixirs, injectables, or the like, by incorporating the appropriate dosage of the compound of Formula I or a physiologically acceptable salt thereof in a dosage range similar to that used with chlordiazepoxide. The compounds of this invention also have been found to possess antibacterial activity.

The compounds of this invention may be prepared by reacting an aldehyde or ketone of the formula $$\text{Ar}-(\text{CH}_2)_r-\overset{\text{O}}{\underset{\|}{\text{C}}}-\text{R} \quad \text{(II)}$$

wherein R, Ar, n and r are as hereinabove defined with a diamine of the formula $$\text{H}_2\text{N}-\text{AB} \quad \text{(III)}$$

wherein A and B are as hereinbefore defined, to produce an intermediate of the formula $$\text{Ar}-(\text{CH}_2)_r-\overset{\text{R}}{\underset{|}{\text{C}}}=\text{N}-\text{AB} \quad \text{(IV)}$$

The compound of Formula IV is then reacted with a thiosalicylic acid, salicylic acid or an ester thereof having the formula

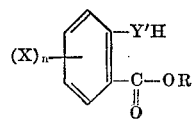

(V)

wherein R, X, and n are as hereinbefore defined and Y' is O or S, to yield products of this invention having the formula

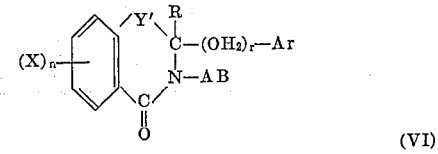

(VI)

wherein R, X, Ar, Y', A, B, r and n are as defined hereinabove. This reaction proceeds smoothly with the formation of water (or alcohol) in a 1:1 molar ratio with the reactant taking place. The completion of the reaction is determined by the formation of an amount of water or alcohol equivalent, on a molar basis, to the amount of reactants employed.

The compounds of Formula VI may additionally be reduced by treatment in the presence of a reducing agent such as lithium aluminum hydride or diborane to produce products of this invention of the formula

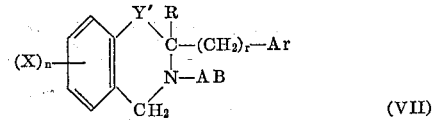

(VII)

wherein X, Ar, R, Y', A, B, r and n are as hereinbefore defined.

The corresponding sulfone and sulfoxide derivatives of the compounds of Formulae VI or VII may be prepared by oxidizing compounds of Formulas VI or VII wherein Y' represents S with potassium permanganate or hydrogen peroxide.

Examples of aldehyde and ketone starting materials in accordance with Formula II are: benzaldehyde, 4-methoxybenzaldehyde, 2-nitrobenzaldehyde, 3-propylthiobenzaldehyde, 3-trifluoromethylbenzaldehyde, 2,4-dimethoxybenzaldehyde, 2-methoxy-4-trifluoromethylbenzaldehyde, phenylpropionaldehyde, 3,4-dimethylbenzaldehyde, benzophenone, 4-chlorobenzophenone, 2,3-dimethoxypropiophenone, 4-trifluoromethylbutyrophenone, 2-chlorocaprophenone, 2-nitropropiophenone, 3-aminoacetophenone, desoxybenzoin, 4-methoxy-β-(4-methoxyphenyl)propiophenone and the like.

Examples of compounds in accordance with Formula V are: thiosalicylic acid, 5-ethylthiosalicylic acid, 5-trifluoromethylthiosalicylic acid, 4-cyano-thiosalicylic acid, 4-ethylthiathiosalicylic acid, 5-dimethylamino-thiosalicylic acid, salicylic acid, 4-methoxy-salicylic acid, 3-amino-salicylic acid, 4-hydroxysalicylic acid and the like.

The compounds of this invention may be obtained as mixtures of optical isomers which may be resolved into the optically active d- and l-forms according to procedures known for the resolution of racemic compounds. For example, use of d-tartaric acid, dibenzoyl-d-tartaric acid, 1-malic acid, d-camphorsulfonic acid, and so forth.

The following examples illustrate the invention. All temperatures are in degrees centigrade unless otherwise stated:

Example 1.—Preparation of 3-[2-(dimethylamino)ethyl]-2,3 - dihydro-2-phenyl-4H-1,3-benzothiazin-4-one, hydrochloride (a) N'-benzylidene-N,N-dimethylethylenediamine.—A solution of 88.0 g. of N,N-dimethylethylenediamine in 150 ml. of benzene is treated with a solution of 106 g. of freshly distilled benzaldehyde in 150 ml. of benzene. This mixture is stirred and refluxed for 2 hours while collecting 22 ml. of an aqueous layer in a Dean-Starke tube. The solvent is then distilled and the residue fractionated to give 156 g. of nearly colorless distillate, B.P. 98–100° (4 mm.).

(b) 3-[2-(dimethylamino)ethyl]-2,3-dihydro-2-phenyl-4H-1,3-benzothiazin-4-one, hydrochloride.—A suspension of 32 g. of thiosalicylic acid in 100 ml. of xylene is treated with a solution of 35.2 g. of the above imine in 70 ml. of xylene. The air in flask is displaced by nitrogen and the mixture stirred and refluxed for 3 hours. (3.3 ml. of water is collected in a Dean-Starke tube during this period.) Part of the xylene (100 ml.) is then distilled and the residue is cooled and dissolved in 500 ml. of ether. The ethereal solution is washed with (1) 100 ml. of 5% sodium bicarbonate (twice), (2) 50 ml. of water (twice) and then with a cold solution of 20 ml. of concentrated hydrochloric acid in 200 ml. of water. The latter aqueous phase is treated with a cold solution of 16 g. of sodium hydroxide in 50 ml. of water and the liberated base extracted with 200 ml. of ether (three times). The ether phases are combined, washed with 50 ml. of water (twice), dried over magnesium sulfate, treated with Darco and filtered. Evaporation of the solvent yields 46.2 g. of pale brown syrup which is dissolved in 50 ml. of ethanol and treated with 20 ml. of 7.4 N alcoholic hydrogen chloride. The solution is diluted to 500 ml. with ether to give 49.5 g. of pale yellow granular solid, M.P. 198–200°. After crystallization from 450 ml. of acetonitrile, the colorless product weighs 40.5 g.; M.P. 201–203°.

Example 2.—3-[2-(diethylamino)ethyl]-2,3 - dihydro - 2-phenyl-4H-1,3-benzothiazin-4-one, hydrochloride A mixture of 10.9 g. of methyl ester of thiosalicylic acid and 13.3 g. of N'-benzylidene-N,N-diethylethylene diamine is treated with nitrogen to displace the air from flask and then heated in an oil bath to 160°. The evolution of methanol begins at this point and the bath is maintained at 175–180° for one hour, (1.2 g. of distillate is collected). The residue is then rapidly distilled at 180–200° (0.1–0.5 mm.) and subsequently redistilled to give 14.4 g. of a gray-green syrup; B.P. 175–185° (0.2 mm.). The hydrochloride and oxalate salts of this distillate are obtained as oils. A solution of 14.0 g. of this material in 25 ml. of ethanol is treated with a solution of 8.8 g. of citric acid monohydrate in 25 ml. of ethanol to give a solution. The addition of 50 ml. of ether causes the separation of a granular solid. After dilution with 100 ml. of ether, cooling and subsequent filtration, the pale yellow granular citrate weighs 15.4 g., M.P. 170–172° (dec.). The latter is digested in 200 ml. of hot acetonitrile, cooled and filtered to give 13.0 g. of nearly colorless solid, M.P. 175–177° (dec.).

A suspension of 9.8 g. of the above water-insoluble citrate in 50 ml. of water is treated with a solution of 10 g. of potassium carbonate in 20 ml. of water and the free base extracted with 100 ml. of ether (three times). The ether extracts are combined, dried over magnesium sulfate, filtered and the filtrate concentrated to give 5.7 g. of residue. The latter is dissolved in 400 ml. of ether and treated with an equivalent of ethereal hydrogen chloride to give 6.1 g. of nearly colorless hydrochloride, M.P. 172–186°. After crystallization of 8.0 g. of the hydrochloride from 130 ml. of acetonitrile, the colorless product weighs 5.5 g.; M.P. 191–193°.

Example 3.—3-[2- (dimethylamino)ethyl]-3,4-dihydro-2-phenyl-2H-1,3-benzothiazine A solution of 30.0 g. of the free base of Example 1 in 200 ml. of dry tetrahydrofuran is added dropwise to a suspension of 5.0 g. of dry tetrahydrofuran and the resulting mixture stirred and refluxed for 8 hours. The mixture is cooled, treated with 10 ml. of cold water and a solution of 4 g. of sodium hydroxide in 20 ml. of water, stirred for 2 hours at room temperature, filtered and the inorganic solids washed with ether. The filtrate is dried over magnesium sulfate, filtered and the solvent evaporated to give the product.

Example 4.—3-[3-(diethylamino)propyl]-2,3 - dihydro-2-methyl-2-p-propylphenyl-6-chloro-4H-1,3-benzothiazin-4-one, hydrochloride Following the procedure of Example 2, but substituting equivalent amounts of N'-α-methyl-p-propylbenzylidine-N,N-diethylpropylene diamine for the N'-benzylidene-N,N-diethylethylene diamine and 5-chlorothiosalicylic acid for the thiosalicylic acid, the desired product is obtained.

Example 5.—3-[2-(dimethylamino)ethyl] - 2,3-dihydro-2-phenyl-7-methoxy - 4H-1,3-benzoxazin - 4-one, hydrochloride Following the procedure of Example 1, but substituting equivalent amounts of 4-methoxysalicylic acid for the thiosalicylic acid, there is obtained the desired product.

Example 6.—3-[2-(dimethylamino)ethyl] - 2,3-dihydro-2-propyl - 2-m-dimethylaminophenyl - 5-ethyl - 4H-1,3-benzothiazin-4-one, hydrochloride Following the procedure of Example 1, but substituting equivalent amounts of m-dimethylaminobutyrophenone for the benzaldehyde, and 6-ethylthiosalicylic acid for the thiosalicyclic acid, the desired product is obtained.

Example 7.—3-[2-(dimethylamino)ethyl - 2,3-dihydro-2-pentyl - 2-p-methoxyphenyl - 4H-1,3-benzothiazin-4-one, hydrochloride Following the procedure of Example 1, but substituting an equivalent amount of 4-methoxycaprophenone for the benzaldehyde, the desired product is obtained.

Example 8.—3-[2-(dimethylamino)ethyl - 2,3-dihydro-2-phenyl - 6-trifluoromethyl - 4H-1,3-benzothiazin-4-one, hydrochloride Following the procedure of Example 1, but substituting an equivalent amount of 5-trifluoromethyl thiosalicylic acid for the thiosalicyclic acid, there is obtained the desired product.

Example 9.—3-[2-(dimethylamino)ethyl]-2,3-dihydro-2-o-trifluoromethylphenyl - 4H-1,3-benzoxazin - 4-one, hydrochloride Following the procedure of Example 1, but substituting equivalent amounts of o-trifluoromethylbenzaldehyde for the benzaldehyde, and salicylic acid for the thiosalicylic acid, the desired product is obtained.

Example 10.—3-[2-(dimethylamino)ethyl] - 2,3-dihydro-2-p-aminophenyl - 6-nitro-4H-1,3-benzothiazin - 4-one, hydrochloride Following the procedure of Example 1, but substituting equivalent amounts of p-aminobenzaldehyde for the benzaldehyde and 5-nitrothiosalicylic acid for the thiosalicylic acid, there is obtained the desired product.

Example 11.—3-[3-(morpholino)propyl] - 2,3-dihydro-2-phenyl - 4H-1,3-benzothiazin-4-one, hydrochloride Following the procedure of Example 1, but substituting an equivalent amount of 3-morpholinopropylamine for the N,N-dimethylethylenediamine, there is obtained the desired product.

Example 12.—3-[4-(pyrrolidino)butyl] - 2,3-dihydro-2-phenyl-4H-1,3-benzothiazin-4-one, hydrochloride Following the procedure of Example 1, but substituting an equivalent amont of 4-pyrrolidinobutylamine for the N,N-dimethylethylenediamine, there is obtained the desired product.

Example 13.—3-[3-(4-methylpiperazino)propyl] - 2,3-dihydro-2-phenyl-4H-1,3-benzothiazin-4-one, hydrochloride Following the procedure of Example 1, but substituting an equivalent amount of 3-(4-methylpiperazino)propylamine for the N,N-dimethylethylenediamine, the desired product is obtained.

Example 14.—3 - [3-{4-(2-methoxyphenyl)piperazino}propyl]-2,3-dihydro - 2-phenyl-4H-1,3-benzothiazin-4-one, hydrochloride Following the procedure of Example 1, but substituting an equivalent amount of 3-{4-(2-methoxyphenyl)piperazino}propylamine for the N,N-dimethylethylenediamine, the desired product is obtained.

Example 15.—3-[2-(dimethylamino)ethyl]-2,3-dihydro-2-phenethyl-4H-1,3-benzothiazin-4-one, hydrochloride Following the procedure of Example 1, substituting an equivalent amount of phenylpropionaldehyde for the benzaldehyde, the desired product is obtained.

Example 16.—3-[3-(4-methylpiperazino)propyl]-2,3-dihydro - 2-phenyl-4H-1,3-benzothiazin - 4-one, hydrochloride Following the procedure of Example 2 but substituting an equivalent amount of N-benzylidene-3-(4-methylpiperazine)propylene for the N'-benzylidene-N,N-diethyldiamine, the desired product is obtained.

Example 17.—3-[2-(dimethylamino)ethyl]-2,3-dihydro-2-(2-pyridyl)-4H-1,3-benzothiazin-4-one, hydrochloride Following the procedure of Example 1 but substituting an equivalent amount of 2-pyridine aldehyde for the benzaldehyde, the desired product is obtained.

Example 18.—3-[2-(diethylamino)ethyl]-2,3-dihydro-2-phenyl-4H-1,3-benzothiazin-4-one, dioxide By treatment of the free base of Example 2 with excess hydrogen peroxide in the presence of acetic acid, the desired product is obtained.

Example 19.—3-[2-(diethylamino)ethyl]-2,3-dihydro-2-phenyl-4H-1,3-benzothiazin-4-one-methobromide By treating the free base of Example 2 with methyl bromide in the presence of acetonitrile, the desired product is obtained.

What is claimed is:

1. A therapeutically active compound having the formula

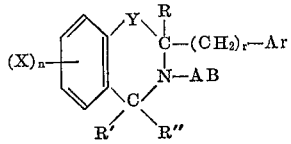

and optical isomers and salts thereof, wherein Ar is selected from the group consisting of phenyl, $(X^1)_n$-substituted phenyl, 3,4-methylenedioxypehnyl, 3,4-ethylenedioxyphenyl, furyl, thienyl, naphthyl, and pyridyl; R is selected from the group consisting of hydrogen, lower alkyl, phenyl, $(X^2)_n$-substituted phenyl, 3,4-methylenedioxyphenyl, 3,4-ethylenedioxyphenyl, furyl, thienyl, naphthyl, and pyridyl; Y is selected from the group consisting of O, S, sulfone and sulfoxide; R' and R" are hydrogen and together R' and R" is oxo; X, $X^1$ and $X^2$ are each selected from the group consisting of hydrogen, lower alkyl, lower alkoxy, amino, di(lower alkyl)amino, halo, lower alkylthio, hydroxy, cyano, nitro, and trifluoromethyl, $n$ is an integer from one to three; $r$ is an integer from 0 to 3; A is lower alkylene; and B is a basic nitrogen-containing radical selected from the group consisting of amino, (lower alkyl)amino, di(lower alkyl)amino, (hydroxy-lower alkyl)amino, di(hydroxy-lower alkyl)amino, di(hydroxyethyl)amino, (phenyl-lower alkyl)amino, (lower alkyl) (phenyl-lower alkyl)amino, piperidyl, (lower alkyl)piperidyl, hydroxyl piperidyl, (lower alkoxy)piperidyl, pyrrolidyl, (lower alkyl)pyrrolidyl, (lower alkoxy)pyrrolidyl, morpholino, (lower alkyl)morpholino, di(lower alkyl)morpholino, (lower alkoxy) morpholino, thiamorpholino, (lower alkyl)thiamorpholino, di(lower alkyl)thiamorpholino, (lower alkoxy)thiamorpholino, piperazyl, (lower alkyl)piperazyl, di(lower alkyl)piperazyl, (lower alkoxy)-piperazyl, (hydroxy-lower alkyl)piperazyl, (alkanoyloxy-lower alkyl)piperazyl, (hydroxy-lower alkoxy-lower alkyl)-piperazyl, di (lower alkyl)amino-(lower alkyl)piperazyl, di(lower alkyl)amino-(lower alkoxy-lower alkyl)piperazyl, and homopiperazyl, wherein the term alkanoyloxy represents radicals of up to 14 carbon atoms.

2. A compound in accordance with claim 1 wherein Y is sulfur; X and X' are both hydrogen; R' and R" is oxo; and AB is di(lower alkyl)amino lower alkyl.

3. A compound in accordance with claim 1 having the name 3-[2-(dimethylamino)ethyl - 2,3-dihydro-2-phenyl-4H-1,3-benzothiazin-4-one hydrochloride.

4. A compound in accordance with claim 1 having the name 3-[2-(diethylamino)ethyl]-2,3-dihydro-2-phenyl-4H-1,3-benzothiazin-4-one, hydrochloride.

5. A compound in accordance with claim 1 having the name 3-[2-(dimethylamino)ethyl]-3,4-dihydro - 2-phenyl-2H-1,3-benzothiazine.

6. A compound in accordance with claim 1 having the name 3-[3-(4-methylpiperazino)propyl] - 2,3-dihydro-2-phenyl-4H-1,3-benzothiazin-4-one, hydrochloride.

References Cited

UNITED STATES PATENTS

| | | | |
|---|---|---|---|
| 3,082,209 | 3/1963 | Surrey | 260—243 |
| 3,093,639 | 6/1963 | Surrey | 260—243 |
| 3,149,106 | 12/1964 | Loev | 260—243 |
| 3,244,704 | 4/1966 | Di Gaudenzio | 260—244 |
| 3,257,396 | 6/1966 | Koo | 260—244 |

HENRY R. JILES, Primary Examiner

J. M. FORD, Assistant Examiner

U.S. Cl. X.R.

260—240, 244, 247.1, 247.5, 247.7, 268, 293.4, 294.3, 294.7, 294.8, 294.9, 295, 296, 297, 326.5, 326.84, 326.85, 329, 332.2, 332.3, 332.5, 340.3, 340.5, 347.2, 347.4, 347.7, 347.8, 465, 470, 471, 473, 516, 518, 519, 521, 570, 570.5, 571, 574, 578, 579, 999

PO-1050
(5/69)

UNITED STATES PATENT OFFICE
CERTIFICATE OF CORRECTION

Patent No. 3,455,915          Dated July 15, 1969

Inventor(s) John Krapcho

It is certified that error appears in the above-identified patent and that said Letters Patent are hereby corrected as shown below:

In Column 2, line 48 "lower-alkyl" should read -- lower alkyl --; and "$N^4(2$" should read -- $N^4-(2$ --. Column 4, formula VI, that portion of the formula reading $C-(OH_2)_r-Ar$      should read      $C-(CH_2)_r-Ar$ Column 7, line 11, before "substituting" insert -- but --; and on line 52, "methylenedioxypehnyl" should read -- methylenedioxyphenyl --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents